(12) United States Patent
Lyles et al.

(10) Patent No.: US 6,240,681 B1
(45) Date of Patent: Jun. 5, 2001

(54) PARKED VEHICLE PROTECTOR

(76) Inventors: Robert T Lyles; Sally S Lyles, both of 1829 Senate St., 19-C; Kermit S King; Carolyn R King, both of 1829 Senate St., 19-B, all of Columbia, SC (US) 29201

( * ) Notice: Subject to any disclaimer, the term of this patent is extended or adjusted under 35 U.S.C. 154(b) by 0 days.

(21) Appl. No.: 09/324,284

(22) Filed: Jun. 2, 1999

Related U.S. Application Data
(60) Provisional application No. 60/110,207, filed on Nov. 30, 1998.

(51) Int. Cl.[7] .................................................. B60Q 1/26
(52) U.S. Cl. .................................. 52/39; 52/27; 40/617; 116/28 R; 472/118
(58) Field of Search ........................... 52/27, 39; 40/606, 40/617; 248/58, 343, 345.1; 116/28 R, 205; 293/102, 103, 121, 142; 472/118

(56) References Cited

U.S. PATENT DOCUMENTS

| | | |
|---|---|---|
| D. 308,848 | 6/1990 | Genicoff . |
| D. 338,646 | 8/1993 | Ortiz . |
| D. 361,542 | 8/1995 | Arauz et al. . |
| 2,062,919 | * 12/1936 | Maas ................................ 293/102 X |
| 2,122,372 | * 6/1938 | Hooper et al. ...................... 116/28 R |
| 2,444,618 | * 7/1948 | Seamster ............................... 472/118 |
| 2,889,165 | 6/1959 | Zientara . |
| 3,141,670 | * 7/1964 | Smyrni et al. .................... 472/118 X |
| 3,738,695 | * 6/1973 | McBee . |
| 4,010,933 | * 3/1977 | Hebda . |
| 4,061,092 | * 12/1977 | Jacobsen et al. ..................... 108/149 |
| 4,530,519 | 7/1985 | Marshall . |
| 4,564,165 | * 1/1986 | Grant et al. ........................... 52/39 X |
| 4,571,903 | 2/1986 | Strassner . |
| 4,639,027 | 1/1987 | Boyd . |
| 5,421,625 | 6/1995 | Arko . |
| 5,527,139 | 6/1996 | Bruder et al. . |
| 6,112,478 | * 9/2000 | Piper ....................................... 52/39 |

* cited by examiner

Primary Examiner—Beth A. Stephan
Assistant Examiner—Brian E. Glessner
(74) Attorney, Agent, or Firm—Michael A Mann; Nexsen Pruet Jacobs & Pollard

(57) ABSTRACT

A protector for preventing damage such as dents and scratches on a parked vehicle. The protector comprises a cushion that is suspended from the ceiling using a rope and positioned between adjacent vehicles. The rope is routed through spaced-apart holes in the cushion to provide two-point support. A stabilizer slat is carried by the rope between cushion and ceiling to prevent twisting of cushion and to dampen vibration of rope upon impact of vehicle door.

18 Claims, 2 Drawing Sheets

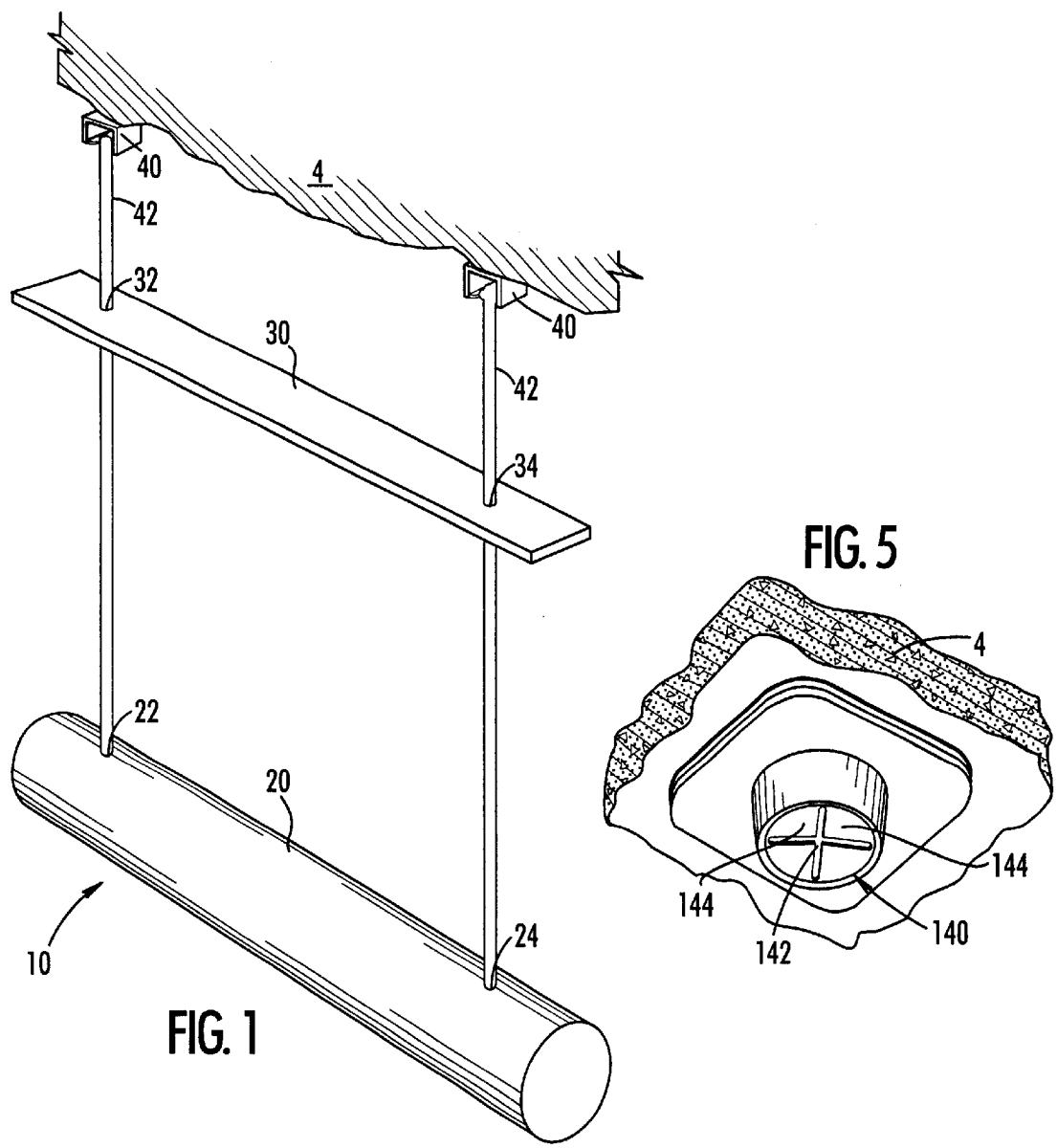
FIG. 5
FIG. 1
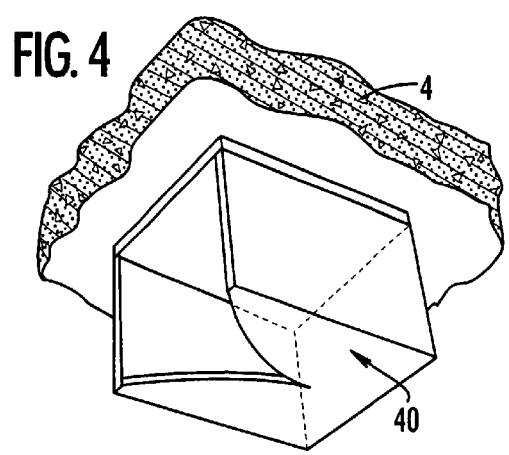
FIG. 4

PARKED VEHICLE PROTECTOR

PRIORITY CLAIM

This application claims the benefit of U.S. Provisional Application No. 60/110,207, filed on Nov. 30, 1998. U.S. Provisional Application No. 60/110,207 is hereby incorporated by reference.

FIELD OF THE INVENTION

The present invention is a device for protecting the exterior body of a vehicle. In particular, the present invention is a device for preventing damage from dents, and scratches on a vehicle parked in a parking garage.

BACKGROUND

With automobiles costing over $20,000 on average, a vehicle represents a significant investment of capital for a family. Protecting the condition of the vehicle assures that it will last a long time and the cost of repair and diminution in value can be avoided. Proper vehicle upkeep includes not only mechanical adjustments but also keeping the vehicle exterior in good condition; that is, clean and free of damage such as dents and scratches.

The operators of parking garages try to maximize the number of vehicles that can be parked in a garage in part by minimizing space between vehicles. Additionally, homes having a garage or car port also have limited space and require close parking. When vehicles are parked very close to each other, the opening of a vehicle door may dent or scratch the adjacent vehicle or the subject vehicle itself because of an obstacle or other vehicle next to the door. Therefore, there is a need for a device to protect a parked vehicle from scratches and dents.

SUMMARY OF THE INVENTION

According to its major aspects and broadly stated, the present invention is a protector for preventing damage to or from a parked vehicle. The protector comprises a cushion that is suspended from the ceiling using ropes and positioned between adjacent vehicles. The rope is routed through spaced-apart holes in the between the cushion and ceiling to prevent twisting of the cushion and to dampen vibration of the cushion upon impact with the vehicle door.

A major advantage of the present invention is that the exterior body of a vehicle is cushioned against the impact of the door of an adjacent vehicle, thereby reducing occurrences of scratches and dents. The protection comes from a cushion that absorbs the shock of the impact of the door of an adjacent vehicle.

A feature of the invention is the simplicity of installation. There are many ways to install the present invention. One way is drilling two spaced apart holes in the ceiling of a parking garage parallel to the parking lines on the floor and installing eyebolts or "J" bolts for supporting the ropes. The simplest method is the use of a plastic device which attaches to the ceiling by a self-contained adhesive and provides a "V" shaped opening into which the support rope, which is knotted at the uppermost end, can be wedged. This type of attachment permits the uppermost end of the rope to come out (and easily be reinserted) should the vehicle's rear view mirror, for example, catch the rope when the vehicle is being moved.

The use of a suspended cushion is another feature of the present invention. The cushion may be suspended at the height which corresponds to the widest portion of the vehicle, where the inter-vehicular spacing is minimal and the incidence of car damage is maximal. This location varies slightly from vehicle to vehicle. Being able to adjust the cushion height makes it possible to protect different cars better.

Use of a relatively narrow cushion, rather than a wider cushion, prevents obstruction of the view of the driver just entering the parking space and about to exit his vehicle.

Another feature of the present invention is the stabilizer slat. The stabilizer slat limits twisting of the cushion from wind and upon impact of the vehicle door. Moreover, the stabilizer slat dampens the vibration of the rope upon impact of the door from the adjacent vehicle.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a perspective view of a protector, according to a preferred embodiment of the present invention;

FIG. 4 is a detailed view of the ceiling fasteners of a protector, according to a preferred embodiment of the present invention;

FIG. 5 is a detailed view of an alternative ceiling fastener of a protector, according to a preferred embodiment of the present invention.

DETAILED DESCRIPTION OF A PREFERRED EMBODIMENT

Figure 2:
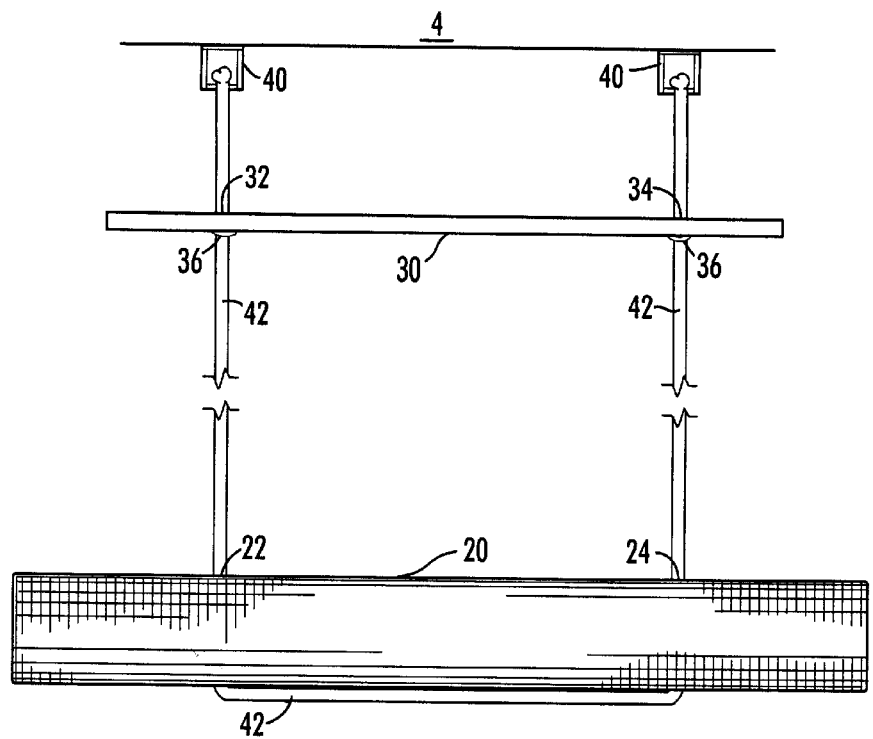
FIG. 2 is a side view of a protector, according to a preferred embodiment of the present invention.
Figure 3:
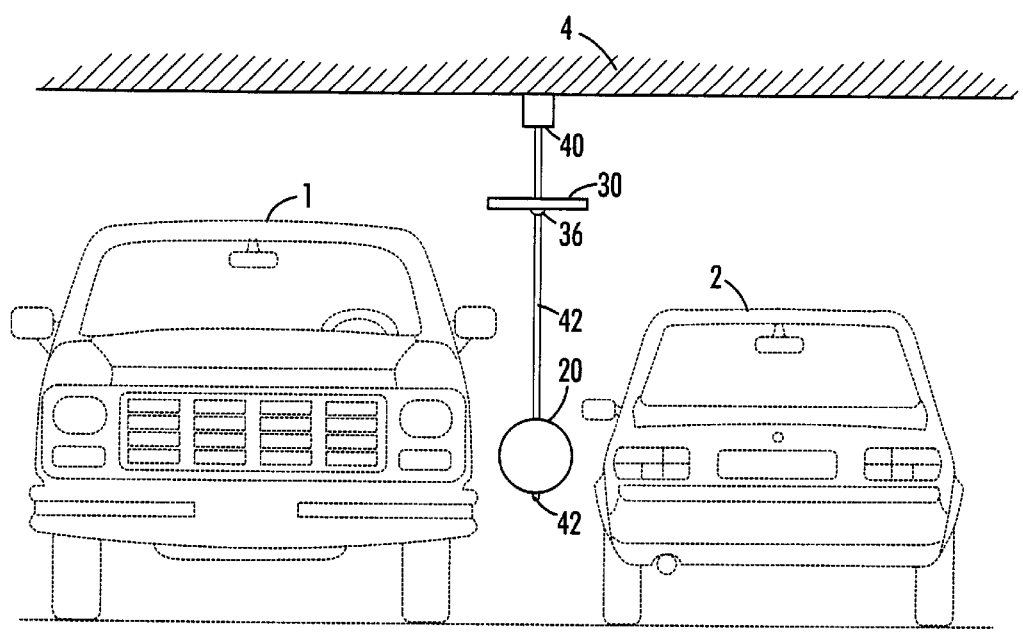
FIG. 3 is a front view of a protector with vehicles in ghost, according to a preferred embodiment of the present invention.

Referring now to the figures, the present invention is a protector for preventing damage, such as dents and scratches, to a parked vehicle. The protector, generally referred to by reference number 10, comprises a cushion 20 and stabilizer slat 30 suspended from the ceiling 4 and preferably positioned between adjacent vehicles 2 as best illustrated in FIG. 3.

Cushion 20 absorbs shock from the door of an adjacent vehicle to prevent scratches and ding. Although cushion 20 could be formed in a variety of shapes capable of protecting damage caused by an adjacent vehicle 2, preferably cushion 20 is formed as an elongated tubular shape having a major dimension and a minor dimension and is oriented with its major dimension being approximately horizontal. Cushion 20 could be various dimensions as long as the length is sufficient to protect vehicle 2 from damage from an adjacent vehicle 1; preferably, cushion 20 has a length of 9 feet. A pair of holes extend through cushion, each dimensioned to receive a rope. Preferably, holes 22 and 24 run parallel to the minor dimension of cushion 20 so that holes 22 and 24 are oriented in a vertical direction as cushion 20 is suspended above the ground. Cushion 20 is preferably made from a natural or synthetic rubber foam, but could be made from any compressible material that absorbs shock from the door of an adjacent vehicle 2 rather than allow damage to a vehicle upon contact, such as an inflatable rubber bladder or styrofoam.

Stabilizer slat 30 dampens movement of cushion 20 to minimize twisting and reduce vibrations of rope 42 upon impact by a vehicle door; additionally, stabilizer slat 30 prevents cushion 20 from twisting rope 42 in windy conditions. Stabilizer slat 30 is positioned between cushion 20 and ceiling 4 along rope 42; preferably, stabilizer slat 30 is positioned slightly closer to ceiling 4 to maximize its dampening effect. Stabilizer slat 30 has a pair of spaced apart apertures 32 and 34 dimensioned for rope 42 to extend therethrough. Preferably apertures 32 and 34 are spaced apart the same distance that holes 22 and 24 in cushion 20 are spaced apart so that cushion 20 holes 22 and 24 and stabilizer slat 30 holes 32 and 34 can be aligned. Although apertures 32 and 34 could be positioned at any point along stabilizer slat 30, preferably apertures 32 and 34 are positioned near the end of the stabilizer slat 30 to maximize stability of the cushion 20. The length of stabilizer slat 30 should be at least as long as distance between spaced-apart holes 22 and 24 in cushion 20. Stabilizer slat 30 preferably rides on a pair of knots 36 in rope 42; however, any other pair of fasteners could be positioned along rope 42 to suspend stabilizer slat 30 above cushion 20.

A rope 42 extends through aligning apertures 32 and 34 on stabilizer slat 30 and holes 22 and 24 in cushion 20. Rope 42 is routed from ceiling 4 through first aperture 32 and first hole 22 to a position underneath cushion 20; next, rope is routed from underneath cushion 20 through second hole 24 and second aperture 34 to be attached to the ceiling 4; rope 42 could also take the opposite route. Each end of rope is attached to the ceiling using ceiling fasteners 40 which could be eye bolts or "J" bolts or plastic hangers as shown. Preferably rope 42 is attached to ceiling fasteners 40 with a knot that would release if pulled with sufficient force as illustrated in FIG. 4. For example, preferably knot would become released if rope 42 gets caught in the side-view mirror of vehicle 2. Although numerous means are known in the art for attaching a rope 42 to the ceiling 4, preferably a plastic fastener 40 that allows movement in the longitudinal direction of cushion 20 is used. This type of fastener 40 allows cushion 20 and rope 42 to give way if a vehicle 2 impacts the front or back or cushion 20 with sufficient force. Alternatively, a ceiling fastener 140 as illustrated in FIG. 5 could be used. Ceiling fastener 140 has a hole 142 for a portion of rope 42 to fit therethrough and be frictionally secured within fastener 140 by flaps 144 along the perimeter of hole 142. Depending upon the height of ceiling 4, length of rope 42 should be of sufficient length to position cushion 20 at a height to protect a vehicle 2. Instead of using a single rope as discussed, a pair of spaced apart ropes suspended from the ceiling 4 could be used. In this case, one end of each rope would be attached to the ceiling 4 while the other end would have a knot or other fastening means positioned below cushion 20 so that cushion 20 rides on knot or other fastening means.

It will be apparent to those skilled in the art that many changes and substitutions can be made to the preferred embodiment herein described without departing from the spirit and scope of the present invention.

What is claimed is:

1. A device for protecting the exterior of a vehicle when said vehicle is parked in a garage, said device comprising:
   a cushion having a pair of spaced-apart holes extending therethrough;
   stabilizing means for dampening vibrations of said cushion
   rope extending through said pair of holes, said stabilizing means carried by said rope; and
   attaching means for securing said rope to a ceiling of a garage, wherein said attaching means is a break-away attaching means that is designed to give way if said cushion receives sufficient impact, said cushion being held by said rope and said attaching means to protect a vehicle against damage from shock from the door of an adjacent vehicle when said device is secured by said rope to said ceiling of said garage and hanging between said vehicle and said adjacent vehicle.

2. The device as recited in claim 1, wherein said stabilizing means is a stabilizer slat having a pair of aligned holes extending therethrough, said rope extending through said pair of spaced-apart holes and extending through said pair of aligned holes.

3. The device as recited in claim 2, wherein, when said device is attached to said ceiling, said slat is positioned on said rope midway between said cushion and the ceiling.

4. The device as recited in claim 1, wherein the vertical position of said cushion is established by knotting said rope at a point along said rope just below the bottom of said cushion when said cushion is placed at the desired elevation.

5. The device as recited in claim 1, wherein said cushion is formed from a material selected from the group consisting of polystyrene, styrofoam, and foam rubber.

6. A device for protecting the exterior of a vehicle when said vehicle is parked in a garage, said device comprising:
   a cushion having a pair of spaced-apart holes extending therethrough;
   rope extending through said pair of holes;
   attaching means for releasibly securing said rope to said ceiling of a garage; wherein said attaching means is a break-away attaching means that is designed to give way if said cushion receives sufficient impact, and
   stabilizing means carried by said rope for dampening vibrations of said cushion, said cushion being held by said rope and said attaching means to protect a vehicle against damage from shock from the door of an adjacent vehicle when said device is secured by said rope to said ceiling of said garage and hanging between said vehicle and said adjacent vehicle.

7. The device as recited in claim 6, wherein said attaching means releases said rope when said cushion receives sufficient impact.

8. The device as recited in claim 6, wherein said stabilizing means further comprises a slat carried by said rope between said cushion and said ceiling.

9. The device as recited in claim 6, wherein said stabilizing means is a stabilizer slat having a pair of apertures extending therethrough, said pair of apertures aligned with said pair of holes in said cushion, said rope extending through said pair of apertures and extending through said pair of holes.

10. The device as recited in claim 9, wherein, when said device is attached to said ceiling, said slat is positioned approximately midway between said cushion and the ceiling.

11. The device as recited in claim 6, wherein said rope is two ropes, one passing through each aperture of said cushion and being knotted at the end of said rope to hold said cushion.

12. The device as recited in claim 6, wherein said cushion is formed from a material selected from the group consisting of polystyrene, styrofoam, and foam rubber.

13. A device for protecting the exterior of a vehicle when the vehicle is parked in a garage, said device comprising:
   a cushion having a pair of spaced-apart holes extending therethrough;
   two ropes, each rope extending through one hole of said pair of holes;

attaching means for securing said two ropes to said ceiling of a garage; wherein said attaching means is a breakaway attaching means that is designed to give way if said cushion receives sufficient impact, and a stabilizer slat having a pair of apertures extending therethrough, said each rope extending through one aperture of said pair of apertures, said cushion being held by said two ropes and said attaching means to protect a vehicle against damage from shock from the door of an adjacent vehicle when said device is secured by said rope to said ceiling of said garage and hanging between said vehicle and said adjacent vehicle.

14. The device as recited in claim 13, wherein said attaching means releases at least one of said two ropes when said cushion is impacted with sufficient force.

15. The device as recited in claim 13, wherein, when said device is attached to said ceiling, said stabilizer slat is positioned approximately midway between said cushion and the ceiling.

16. The device as recited in claim 13, wherein the vertical positions of said cushion and said stabilizer slat is established by knotting said two ropes below said cushion and said slat.

17. The device as recited in claim 13, wherein said cushion is formed from a material selected from the group consisting of polystyrene, styrofoam, and foam rubber.

18. The device as recited in claim 13, wherein said cushion is an inflatable bladder.

* * * * *